(12) United States Patent
Arunachalam et al.

(10) Patent No.: US 11,748,972 B2
(45) Date of Patent: *Sep. 5, 2023

(54) SYSTEMS AND METHODS FOR IDENTIFYING A SERVICE QUALIFICATION OF A UNIT BASED ON AN IMAGE-BASED WINDOW ANALYSIS

(71) Applicant: Verizon Patent and Licensing Inc., Basking Ridge, NJ (US)

(72) Inventors: Harish Arunachalam, Frisco, TX (US); Somasekhar C. Nekkalapudi, Dallas, TX (US); Vipul Jha, Plano, TX (US); Shail Bhatt, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,868

(22) Filed: Nov. 18, 2022

(65) Prior Publication Data
US 2023/0088048 A1    Mar. 23, 2023

Related U.S. Application Data

(63) Continuation of application No. 17/304,595, filed on Jun. 23, 2021, now Pat. No. 11,521,369.

(51) Int. Cl.
*G06V 10/60* (2022.01)
*G06T 7/00* (2017.01)
*H04N 23/71* (2023.01)
*H04N 23/74* (2023.01)

(52) U.S. Cl.
CPC ............ *G06V 10/60* (2022.01); *G06T 7/0002* (2013.01); *H04N 23/71* (2023.01); *H04N 23/74* (2023.01)

(58) Field of Classification Search
CPC .... G06V 10/60; G06T 7/0002; H04N 5/2351; H04N 5/2354
USPC ......................................................... 382/276
See application file for complete search history.

(56) References Cited

U.S. PATENT DOCUMENTS

| | | |
|---|---|---|
| 4,845,761 A | 7/1989 | Cate et al. |
| 10,405,196 B1 | 9/2019 | Chadaga et al. |
| 2015/0247788 A1 | 9/2015 | Paul et al. |
| 2020/0230663 A1 | 7/2020 | Mcbride et al. |

*Primary Examiner* — Stephen P Coleman (57) ABSTRACT

In some implementations, a service qualification system may receive, from a user device, a set of images that depict a window. The service qualification system may perform an image-based analysis of the set of images to determine a reflectivity score associated with the window. The reflectivity score may be indicative of a quality associated with a signal of the service being received through the window. The service qualification system may determine, based on the reflectivity score, a service qualification metric that is indicative of a capability of receiving the service within the unit. The service qualification system may perform an action associated with the service qualification metric.

20 Claims, 8 Drawing Sheets

SYSTEMS AND METHODS FOR IDENTIFYING A SERVICE QUALIFICATION OF A UNIT BASED ON AN IMAGE-BASED WINDOW ANALYSIS

RELATED APPLICATION

This application is a continuation of U.S. patent application Ser. No. 17/304,595, (now U.S. Pat. No. 11,521,369), entitled "SYSTEMS AND METHODS FOR IDENTIFYING A SERVICE QUALIFICATION OF A UNIT BASED ON AN IMAGE-BASED WINDOW ANALYSIS," filed Jun. 23, 2021, which is incorporated herein by reference in its entirety.

BACKGROUND

A network service (e.g., Internet access) may be provided via a wireless network (e.g., a fifth generation (5G) wireless network) to a customer residing in a unit of a building (or a single-family home), and/or to multiple customers residing in units (e.g., apartments, condominiums, and/or the like) of a community. Whether the customers are capable of receiving the network service within a unit of a building or community may depend on certain physical characteristics of the unit, the building, or the community.

DETAILED DESCRIPTION OF PREFERRED EMBODIMENTS

The following detailed description of example implementations refers to the accompanying drawings. The same reference numbers in different drawings may identify the same or similar elements.

A 5G home Internet service is a 5G wireless network service that connects a customer's home with ultra-wide band Internet. Coverage of a wireless network is an important factor for providing quality network services, such as ultra-fast Internet. Currently, if a customer lives in a unit of a building (e.g., an apartment unit, a condominium unit, a townhome, and/or the like) and/or in a building and desires a network service, the customer provides, to a network provider, a street address of the building. The network provider qualifies the unit for the network service based on a general availability of the network service at the street address. However, due to a location of the unit within the building or a location of the building, the unit may not actually be qualified for the network service despite the address qualification (e.g., due to physical characteristics of the unit or building and/or obstructions within a physical environment of the unit and/or the building). As a specific example, certain types of windows of a unit or building (e.g., a window with low-emissivity (low-E) glass, a window with a certain type of low-E glass, or other type of glass that may degrade signal quality of the service) may prevent a transceiver (or antenna) associated with the network service from transmitting or receiving a signal associated with the network service, despite the street address of the unit or building being included within a coverage area of the network service. Accordingly, using the street address without consideration of the type of window of the unit or the building may cause false positives (e.g., indicating network coverage) for the network service with respect to qualifying for internal mounting of a transceiver to receive the network service. Thus, current techniques waste computing resources (e.g., processing resources, memory resources, communication resources, and/or the like), networking resources, human resources, and/or the like by incorrectly qualifying wireless network coverage for a network service, correcting the wireless network coverage for the network service, and/or handling customer complaints associated with the network service.

Some implementations described herein provide a service qualification system (and/or a user device) that determines a type of a window based on an image-based analysis and/or that qualifies a unit to receive a service (e.g., a wireless communication service, such as a 5G wireless network service) based on the type of window. The service qualification system and/or the image-based analysis of the window may determine the type of the window by determining a reflectivity of the window using a set of images. The reflectivity of the window may be determined based on a comparison of a first image of the set of images that is captured without a flash and a second image of the set of images that is captured with a flash. The set of images may be captured using a user device, such as a user device of a customer seeking to receive the service within the unit.

In some implementations, the service qualification system may receive, from a user device, a set of images that depict a window. A first image of the set of images may have been captured with a flash mode of a camera of the user device and a second image of the set of images may have been captured with a non-flash mode of the camera. Accordingly, the service qualification system may perform an image-based analysis of the set of images to determine a reflectivity score associated with the window, which may be indicative of a type of the window. Based on the reflectivity score, and one or more other factors associated with qualifying the unit, the service qualification system may determine a service qualification metric, which is indicative of whether the unit qualifies to receive the service. Accordingly, the service qualification system may perform an action associated with the service qualification metric, such as provide, based on the service qualification metric, a notification to the user device that indicates whether the unit is capable of receiving the service.

In this way, the service qualification system identifies a service qualification metric of a unit of a building (e.g., a unit within the building) using an image-based analysis of a window (e.g., a window depicted in a set of images captured by a user device). The service qualification system may reduce time required to enable a service to be received for the unit by utilizing a readily available device to a user (e.g., as a consumer seeking to receive the service in the unit), rather than specialized equipment that is specifically configured to determine a type of a window. For example, the service qualification system may use or be associated with a user device, rather than the specialized equipment, that is capable of capturing images of the window and providing the images to the service qualification system for the image-based analysis. Accordingly, the service qualification system, may determine, prior to provisioning or configuring the unit to receive the service, the necessary hardware components that are required to enable the unit to receive the service without requiring a service technician or representative to determine the type of window using specialized equipment for analyzing the window. Furthermore, the service qualification system, as described herein, conserves computing resources, networking resources, human resources, and/or the like that would otherwise have been used to incorrectly qualify wireless network coverage for a network service (e.g., that involves an interior mounting of a transceiver within a unit that has a type of window that prevents receiving the network service via an interior mounting of the transceiver), correct the wireless network coverage for the network service, handle customer complaints associated with the network service, and/or the like.

Figure 1A:
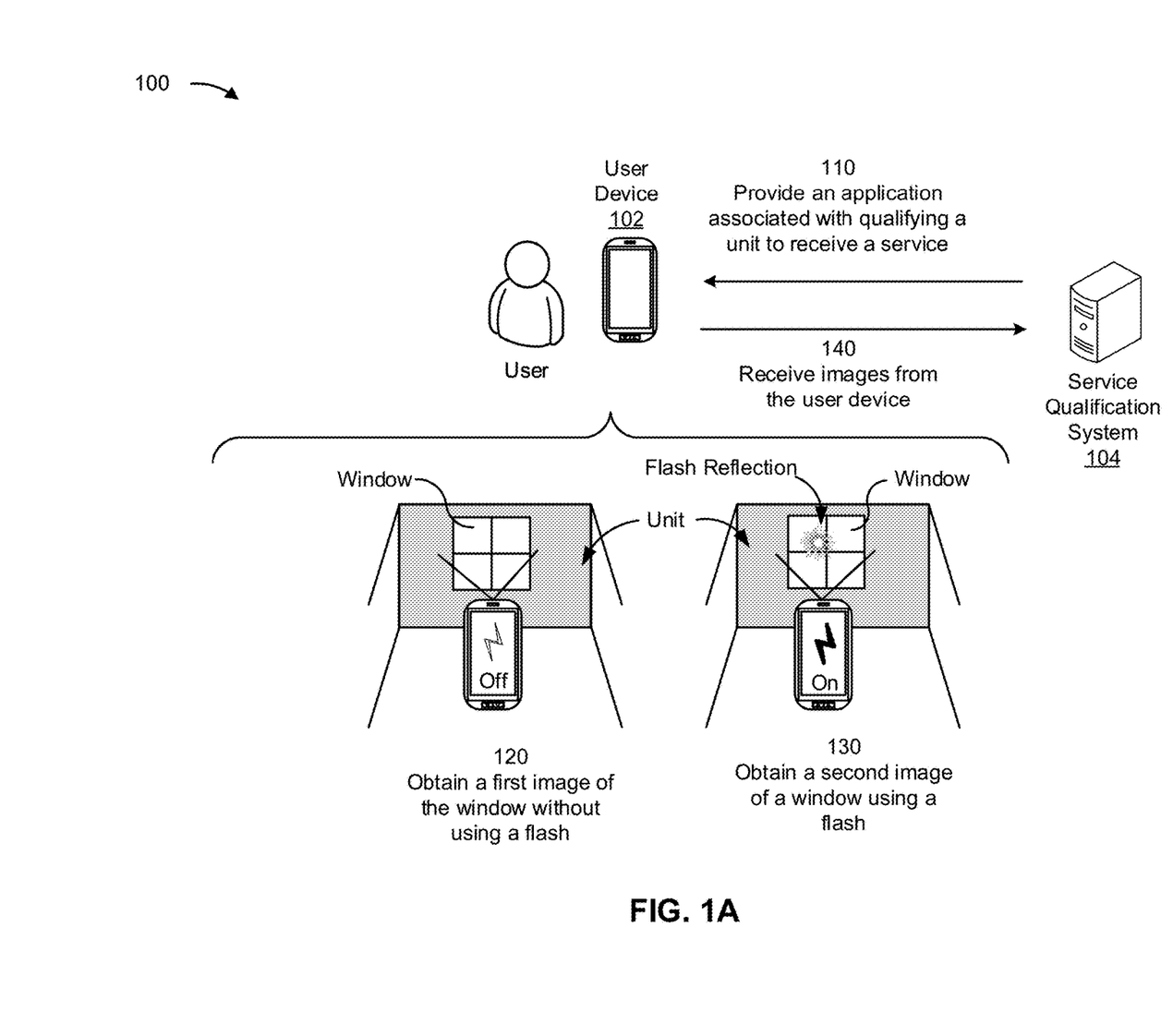
FIGS. 1A-1C are diagrams of an example associated with identifying a service qualification of a unit based on an image-based window analysis.
Figure 1B:
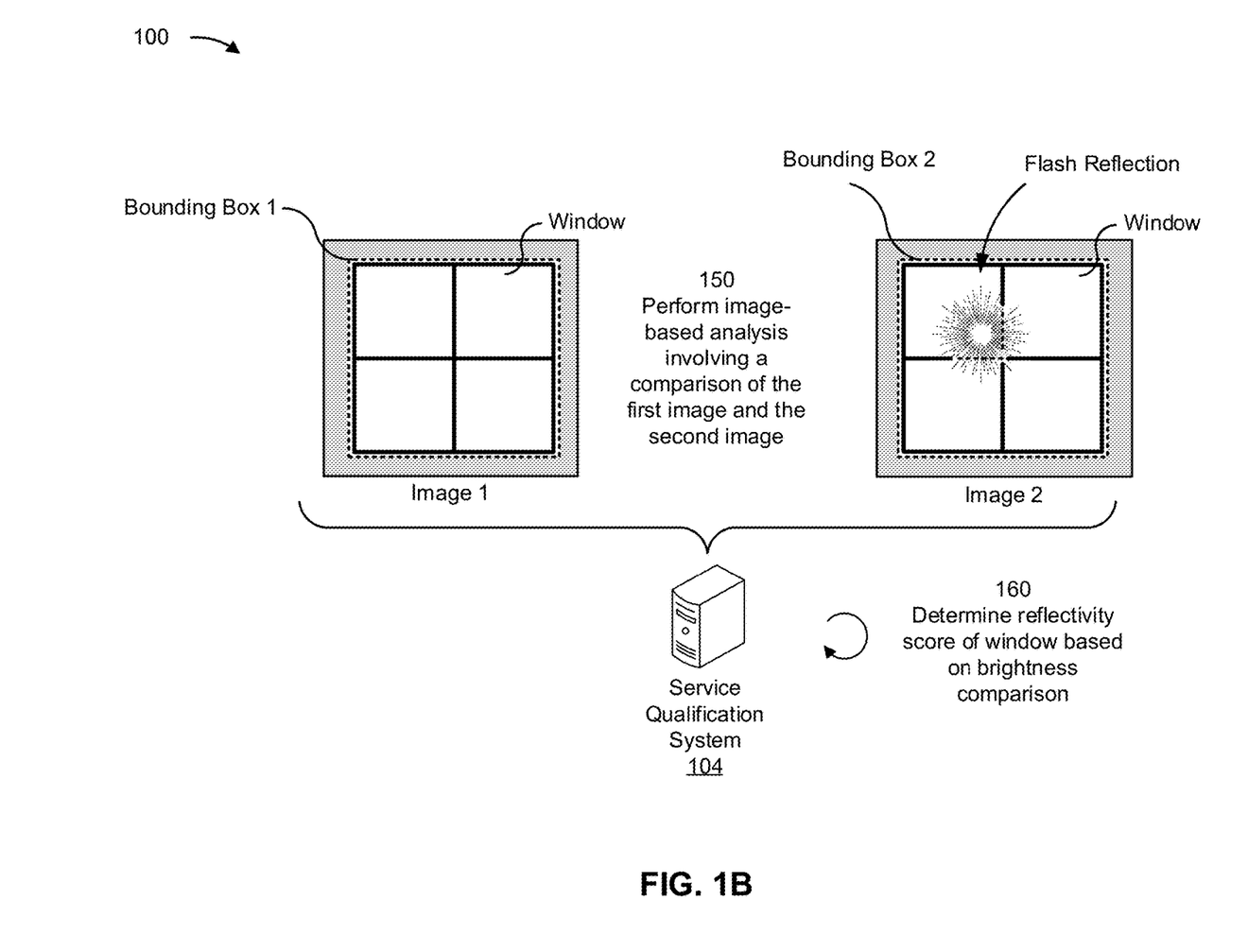
Figure 1C:
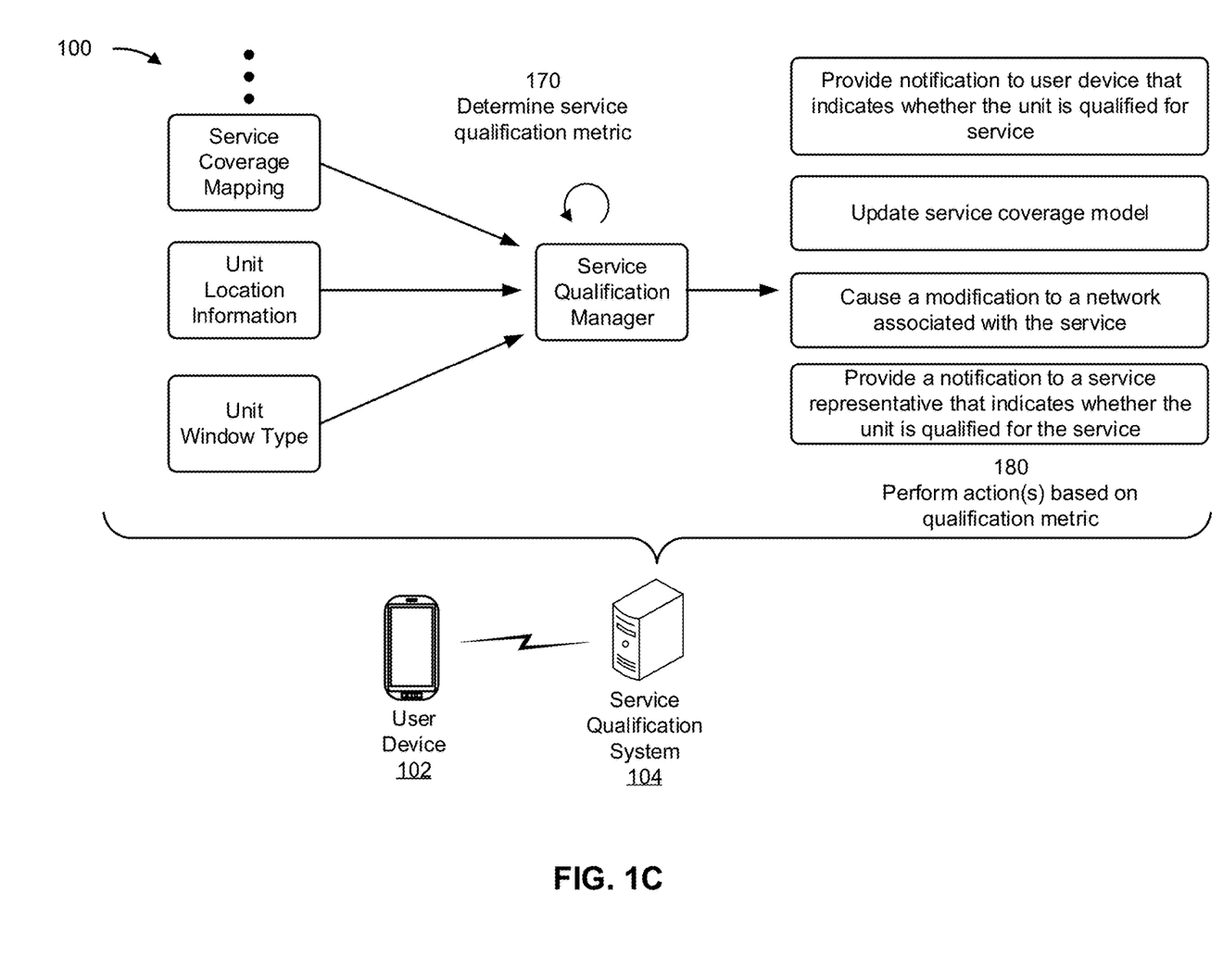

FIGS. 1A-1C are diagrams of an example implementation 100 associated with identifying a service qualification of a unit based on an image-based window analysis. As shown in FIGS. 1A-1C, example implementation 100 includes a user device 102 and a service qualification system 104. The user device 102 may include a mobile device, a computer, a smart phone, and/or the like that a user may utilize to provide information to and/or receive information from the service qualification system 104. The service qualification system 104 may include a system that determines whether a service is available for a unit of a building. The unit may correspond to an individual room of a building (e.g., a room of a single-family home) that includes a window. In some implementations, the unit may correspond to an apartment unit, a condominium unit, and/or a townhome. The service may include, for example, establishing a local area network via an ultrawide band wireless network (e.g., for a resident of the unit or other type of individual that utilizes the unit). Additionally, or alternatively, the service may include establishing the local area network using one or more transceivers (or antennas) that are configured for internal mounting, such that the one or more transceivers are mounted within the unit and such that a signal of the service is required to be transmitted or received through a window. Although examples described herein are discussed in connection with a window, the examples may similarly apply to certain types of doors (e.g., doors that include glass) or other types of structures through which a signal of a service may be transmitted or received.

As shown in FIG. 1A, and by reference number 110, the service qualification system 104 provides, to the user device 102, an application associated with qualifying the unit to receive the service. In some implementations, the application is provided to the user device based on receiving, from the user device, a service request for the service. For example, the user may be seeking to have the service installed within the unit and/or seeking to have the unit configured to receive the service. Accordingly, the user may utilize the user device to request the service qualification system 104 to provide the application to permit the user to determine whether the unit is qualified to receive the service.

The application may be associated with determining whether the unit is qualified to receive the service. In some implementations, the user may utilize user device 102 to download the application from the service qualification system 104 or another source and/or to install the application. Once the application is installed on the user device 102, the user may utilize the user device 102 to set up the application. For example, the application may request that the user provide credentials (e.g., a username, a password, an employee identifier, and/or the like) for accessing the application.

In some implementations, the application may enable the user device 102 to obtain a set of images of a window. For example, the application may be installed on the user device 102 to enable the user to control a camera of the user device 102 to capture images that depict the window for an image-based analysis of the window, as described elsewhere herein. In some implementations, the application may be configured to request the user to opt into allowing the application to control or configure one or more operations or components of the user device 102, such as enabling access to control a camera of the user device 102 and/or enabling access to an image library associated with the user device 102 and/or the user (e.g., to permit the application to obtain images that depict the window).

As described herein, the application may be configured to set a mode of the camera. More specifically, the application may be configured to automatically set (e.g., based on a user input and/or detecting a window within a field of view of the camera) the camera to use a flash mode and/or to use a non-flash mode. The flash mode may involve or cause activation of a flash (or other type of light emitter) of the camera in combination with capturing an image. The non-flash mode may involve the camera capturing the image without activation of the flash.

As further shown in FIG. 1A, and by reference number 120, the user device 102 obtains a first image of the window in the unit without using the flash. The first image may be an image of a set of images that is used by the service qualification system 104 (and/or the application) to determine a type of the window using an image-based analysis of the window, as described elsewhere herein.

The camera of the user device 102 may capture the first image using a non-flash mode of the camera. In some implementations, the user, via a user input to the application, may cause the camera to capture the first image. Accordingly, the user device 102 may obtain the first image from the camera via a received application for qualifying the unit for a service. In some implementations, the application may be configured to automatically set the camera to use the non-flash mode based on a user input to the application (e.g., a user input that is configured to capture one or more images of a set of images described herein). In such a case, the user may not be required to manually set the camera to be in the non-flash mode to capture the first image.

The user may capture the first image via a user input to a camera application of the user device 102. In such a case, the user may manually set, via the camera application, the mode of the camera to be in the flash mode. In this way, after the image is captured via the camera application, the user device 102 may obtain the first image from an image library associated with the camera application.

In some implementations, prior to obtaining the first image, the user may be directed, via the application, to position the user device 102 in a manner that places the window within a field of view of the camera. For example, the application may be configured to cause a display device of the user device 102 to indicate an instruction for the user to capture the set of images. The instruction may request the user to place the window within the field of view, place the camera within a certain range of distances of the window, adjust or set ambient lighting within the unit to a particular level, capture the image during a certain time of day and/or when an exterior side of the window is under certain lighting conditions (e.g., daytime, nighttime, twilight, and/or lighting conditions associated with certain types of weather conditions).

In some implementations, the user device 102 and/or the application may automatically cause the camera to capture the first image without receiving a user input based on sensing (e.g., via one or more light sensors or the camera) that conditions for capturing a set of images for an image-based analysis are sufficient and/or based on detecting that the window is within the field of view of the camera (e.g., using an image processing model that is configured to identify or detect a window). For example, the user device 102 and/or the application may be configured to perform an image processing of preview frames of the field of view. The preview frames may be captured or streamed to a display device of the user device 102 when the camera is in a preview mode that is configured indicate, to a user, the field of view of the camera on the display device.

Accordingly, once the window is within the field of view and/or once certain conditions for capturing the first image are satisfied, the user and/or the application may cause the camera to capture the first image of the window using a non-flash mode of the camera.

As further shown in FIG. 1A, and by reference number 130, the user device 102 obtains a second image of the window using a flash. The second image may be an image of the set of images that is used by the service qualification system 104 (and/or the application) to determine a type of the window using an image-based analysis of the window, as described elsewhere herein.

The camera of the user device 102 may capture the second image using a flash mode of the camera. In some implementations, the user, via a user input to the application, may cause the camera to capture the second image. The user input may be the same user input that caused the camera to capture the first image or may be a separate user input that causes the camera to separately capture the second image. Accordingly, the user device 102 may obtain the second image from the camera via the application. In some implementations, the application may be configured to automatically set the camera to use the flash mode to capture the second image based on the first image being captured using the non-flash mode. In such a case, the user may not be required to manually set the camera to be in the flash mode to capture the second image.

In some implementations, the second image may be obtained based on a same user input that was provided to obtain and/or capture the first image. For example, the user may provide a single user input (e.g., via the application) that causes the camera to capture the first image and the second image. The application may be configured to control, based on the single user input from the user, the camera to capture the first image using the non-flash mode of the camera and the second image using the flash mode of the camera. The application may be configured to control the user device 102 and/or the camera to capture the first image and the second image within a threshold time period. The threshold time period may have a length (e.g., 10 milliseconds, 100 milliseconds, or the like) that is likely to ensure that the first image and the second image are captured in a same (or similar) position or under a same (or similar) set of conditions. In this way, because the first image and the second image are likely to be captured from a same position or under a same set of conditions, a flash reflection that is depicted in the second image is most likely to be a primary (or only) difference between the first image and the second image.

The user may capture the second image via a user input to the camera application of the user device 102. In such a case, the user may manually set the mode of the camera to be in the flash mode. In some implementations, the application may instruct, via a display device of the user device 102, the user to capture the second image with the camera in a same (or similar position) and/or under the same or similar conditions as the first image. For example, the application may indicate, based on an image analysis of the first image and preview frames of the second image, to position the user device 102 in a manner that corresponds to the position of the user device 102 when the user captured the first image. Additionally, or alternatively, the application may instruct the user to captured the second image within a threshold period of time (e.g., to improve the likelihood that the second image is captured under the same or similar conditions as the first image). In this way, the user device 102 may obtain the second image from the image library associated with the camera application.

In this way, the application may permit the user to capture a set of images that includes a first image captured without a flash and a second image captured with a flash. In some implementations, a first plurality of images may be captured using a non-flash mode and second plurality of images may be captured using the flash mode. In such a case, the first plurality of images may be processed (e.g., analyzed and/or combined according to an image processing model) to obtain the first image from one or more of the first plurality of images, and the second plurality of images may be processed to obtain the second image from one or more of the second plurality of images. For example, using any suitable image processing technique that is based on processing multiple images to form a single image, a first image may be obtained from the first plurality of images based on a combination of the first plurality of images and a second image may be obtained from the second plurality of images based on a combination of the second plurality of images. Additionally, or alternatively, using any suitable image processing technique that is configured to select an optimal image from a plurality of images, a first image may be obtained via a selection of one or more of the first plurality of images and second image may be obtained via a selection of one or more of the second plurality of images. Such an image processing technique may be performed using an image processing model that is trained to identify an optimal image based on any suitable measure of quality, such as clarity, color, contrast, brightness, or other image characteristic that may be indicative of quality of an image. Although example implementation 100 describes the first image as being captured using a non-flash mode and the second image as being captured using a flash mode, in other examples, the first image may be captured using a flash mode and the second image may be captured using a non-flash mode.

As further shown in FIG. 1A, and by reference number 140, the service qualification system 104 receives the images (e.g., the first image and the second image) from the user device 102. The user device 102 may provide the first image and the second image, as a set of images, to the service qualification system 104. For example, the user may upload the set of images to the service qualification system 104 to determine whether the window, based on the first image and the second image, is a type of window that enables the service to be received in the unit and/or that enables internal mounting of a transceiver (or antenna) of the service within the unit.

In some implementations, the application may cause the user device 102 to establish or engage in a communication session with the service qualification system 104 and transmit the set of images to the service qualification system 104. In some implementations, the application may automatically establish the communication session with the service qualification system 104 and/or may automatically transmit (e.g., via the communication session) the set of images to the service qualification system 104 based on obtaining the first image and the second image.

Accordingly, the set of images may be provided to and/or received by the service qualification system 104 to enable the service qualification system 104 to perform an image-based analysis of the window that is based on a comparison of the first image and the second image.

As shown in FIG. 1B, and by reference number 150, the service qualification system 104 performs an image-based analysis involving a comparison of the first image and the second image. The image-based analysis may be configured to analyze the window as depicted in the first image (Image 1) and the second image (Image 2).

In some implementations, the service qualification system 104 may preprocess the first image and/or the second image to identify a bounding box associated with a portion (a first portion shown by Bounding Box 1 in FIG. 1B) of the first image that depicts the window and a bounding box associated with a portion (a second portion shown by Bounding Box 2 in FIG. 1B) of the second image that depicts the window. For example, the service qualification system 104 may utilize an object detection technique, an edge detection technique, and/or other type of bounding box detection technique to identify pixels in the first image that are associated with the window and pixels in the second image that are associated with the window. In this way, the service qualification system 104 may identify and/or extract a portion of the first image and a portion of the second image that correspond to window so that image data that is not associated with the window is not analyzed as part of an image-based analysis of the window.

The image-based analysis may involve a comparison of a brightness of the first image and a brightness of the second image. For example, the service qualification system 104 may determine measures of brightness of the images. A measure of brightness may be based on a quantity of pixels of an image (or a portion of the image) that satisfy a minimum brightness threshold (e.g., a threshold that is based on a particular hue of white and/or a threshold associated with particular range of red, green, blue (RGB) values). More specifically, the service qualification system 104 may determine a first measure of brightness of the first image and a second measure of brightness of the second image. In some implementations, pixels of an image may be assigned to various bins that correspond to different brightness levels (or ranges) of pixel values of the pixels (or a brightness level of an individual color of a color space of the image). The measure of brightness of an image may be based on a quantity of pixels that are assigned to bins that are associated with the brightest pixel values. Accordingly, the greater the quantity of pixels in the bins that are representative of the brightest pixel value ranges, the brighter the image, and the lesser the quantity of pixels in the bins that are representative of the brightest pixel value ranges, the dimmer the image.

Accordingly, the service qualification system 104 may determine the first measure of brightness based on pixel values associated with pixels of the first image (e.g., pixel values associated with Bounding Box 1) that depict the window. In such a case, the first measure of brightness may be determined based on a quantity of first pixels (pixels associated with Bounding Box 1) of the first image that have pixel values that satisfy the minimum brightness threshold. Correspondingly, the service qualification system 104 may determine the second measure of brightness based on pixel values associated with the pixels of the second image (e.g., pixel values associated with Bounding Box 2) that depict the window. Accordingly, the second measure of brightness may be determined based on a quantity of second pixels (pixels associated with Bounding Box 2) of the second image that have pixel values that satisfy the minimum brightness threshold.

While example implementation 100 may involve a comparison of a brightness of the first image and the second image, other examples may involve other characteristics of the image, such as color, contrast, or other types of image-based characteristics.

As further shown in FIG. 1B, and by reference number 160, the service qualification system 104 determines a reflectivity score of the window based on the brightness comparison. For example, the service qualification system 104 may determine the reflectivity score based on a ratio and/or a difference between the first measure of brightness that is associated with the first image and the second measure of brightness that is associated with the second image.

The reflectivity score may be indicative of a type of the window based on a score threshold. For example, the reflectivity score may be compared to the score threshold. In such a case, if the reflectivity score does not satisfy the score threshold, the service qualification system 104 may determine that the window is a first type of window (e.g., a window that does not have low-emissivity (low-E) glass, a window that is relatively clear, or a window that is not tinted). In contrast, if the reflectivity score does satisfy the score threshold, the service qualification system 104 may determine that the window is a second type of window (e.g., an energy efficient window with low-E glass and/or a tinted window).

A ratio or a difference in brightness between the first image and the second image can be inferred to be caused by the first image being captured without using a flash (e.g., with the camera in a non-flash mode) and the second image being captured using the flash (e.g., with the camera in a flash mode). For example, the second image may be expected to be brighter than the first image (e.g., the second image is expected to have a greater measure of brightness than the second image) due to the reflection of the flash in the window that is depicted in the second image but is not depicted in the second image (because the flash was not used to capture the first image). A relatively greater difference between the brightness of the first image and the brightness of the second image may be relatively more indicative of the window causing a strong reflection of the flash, which is indicative of the window being relatively more reflective and/or a window that includes low-E glass or tint. In contrast, a relatively lesser difference between the brightness of the first image and the brightness of the second image may be relatively less indicative of the window causing a strong reflection of the flash, which is indicative of the window being relatively less reflective and/or a window that does not include low-E glass or tint. More specifically, if the second image is determined to be a percentage brighter threshold (e.g., at least 5% brighter, 10% brighter, 20% brighter, or more), the service qualification system may determine that the window is a low-E window and/or a tinted window. On the other hand, if the second image is determined to not be the percentage brighter threshold, then the service qualification system may determine that the window is not a low-E window and/or not a tinted window. In some implementations, a percentage of brightness of the second image relative to the first image may indicate a type of low-E glass within the window and/or a degree of tint of the window. For example, if the second image is within a first percentage range of being brighter than the first image (e.g., a percentage range of being 5% to 15% brighter), the service qualification may determine that the window includes a first type of low-E glass (e.g., a soft coated low-E glass that includes a silver, zinc, or tin coating on the window). Further, if the second image is within a second percentage range of being brighter than the first image (e.g., a percentage range of being 15% brighter or more), the service qualification may determine that the window includes a second type of low-E glass that is different from the first type (e.g., a hard coated low-E glass, such as a glass mixed with molten tin).

Although one or more examples of example implementation 100 involve the service qualification system 104 performing the image-based analysis of the window, in other examples, the user device 102 may locally perform the image-based analysis of the window to determine the reflectivity score and/or a type of the window, as described herein.

As shown in FIG. 1C, and by reference number 170, the service qualification system 104 determines a qualification metric. As shown, the service qualification system 104 may utilize a service qualification manager that determines the service qualification metric based on a unit window type, unit location information, and a service coverage mapping, among other examples. More specifically, the service qualification manager may determine the service qualification metric based on the reflectivity score of the window as determined by the image-based analysis of the window, a location of the unit as indicated in the unit location information, and a signal strength of the service at the location as indicated by service coverage mapping. Correspondingly, the service qualification metric may be indicative of a capability of receiving the service within the unit. Additionally, or alternatively, the service qualification metric may be indicative of a particular type of service that the unit is qualified to receive (e.g., a type that involves an internally mounted transceiver or a type that involves an externally mounted transceiver).

The service qualification metric may indicate that the unit is capable of receiving the service using an internally mounted transceiver when the network coverage exists or is sufficiently strong (e.g., a signal strength of the service satisfies a threshold) and when the reflectivity score is below a score threshold, which would allow the service to be provided to the unit. The service qualification metric may indicate that the unit is not capable of receiving the service when the network coverage does not exist and/or is not sufficiently strong (e.g., a signal strength of the service that does not satisfy a threshold) to allow the service to be provided to the unit. The service qualification metric may indicate that the unit is capable of receiving the service when the network coverage exists or is sufficiently strong, but incapable of receiving the service via an internally mounted transceiver when the reflectivity score is at or above the score threshold. In such a case, the unit may qualify to receive the service using an externally mounted transceiver (and/or an externally mounted antenna) (e.g., if the window or another window (or door) within the unit can be opened and/or a mounting location of the externally mounted transceiver would be accessible to a service technician).

The service qualification manager may utilize the service coverage mapping and the unit location information to determine whether the unit is located within network coverage of a network (e.g., a network associated with the service) and/or the network coverage is sufficient to allow the service to be provided to the unit. The reflectivity score and/or type of window may indicate whether the unit qualifies for a service and/or whether the unit qualifies for the service using an internally mounted transceiver. For example, a window that has low-E glass and/or that is tinted may be less likely to enable a unit to qualify for the service than a window that does not have low-E glass or that is not tinted. In some cases, a low-E window and/or tinted window may render the unit incapable of receiving the service because the window would degrade or block signals associated with the service if a transceiver for the service were to be internally mounted.

In some cases, if the unit is located in an area with relatively strong network coverage and has windows with a relatively high reflectivity score (or windows determined to have low-E or tinted glass), the unit may still qualify for the service and/or qualify to receive the service using an internally mounted transceiver. For example, the score threshold may be set or determined based on a strength of the network coverage at a location of the unit. Accordingly, the service qualification manager, to determine the service qualification metric, may determine the score threshold based on the determined network coverage at the location, and correspondingly compare the reflectivity score to the score threshold that is based on the strength of the network coverage.

In this way, the service qualification system 104 (e.g., via the service qualification manager) may determine whether the reflectivity score satisfies a score threshold that is indicative of a type of the window, and determine the service qualification metric based on whether the reflectivity score satisfies the score threshold.

As further shown in FIG. 1C, and by reference number 180, the service qualification system 104 performs one or more actions based on the qualification metric. For example, the service qualification system 104 may provide a notification to the user device 102 that indicates whether the unit is qualified for the service. The notification may indicate whether the unit is qualified to receive the service according to the service qualification metric (e.g., whether the unit is qualified for the service via an internally mounted transceiver or an externally mounted transceiver). In some implementations, the notification may instruct the user to perform a modification to the window. For example, when the service qualification metric indicates that the unit is not capable of receiving the service via an internally mounted transceiver, the service qualification system 104 may request the user to indicate whether the window includes a tinted film and, if the window includes a tinted film, instruct the user to remove the tinted film from the window. Additionally, or alternatively, the notification may request the user to provide a set of images associated with a different window of the unit to determine whether the different window is a type that would facilitate receiving the service via an internally mounted transceiver.

In some implementations, the service qualification system 104 may determine that the service qualification metric indicates that the unit does not qualify for the service (e.g., a service involving an internally mounted transceiver). In such a case, the service qualification metric may determine whether the service qualification metric indicates whether the unit qualifies for another service (e.g., a service involving an externally mounted transceiver). The service qualification system 104 may provide, to the user device, a notification that indicates that the unit does not qualify for the service and whether the unit qualifies for the other service.

In some implementations, the one or more actions may include updating a service coverage model. For example, service qualification system 104 may update (or cause to be updated) a service coverage model associated with the service coverage mapping to include an identifier of the unit, the unit location information, the geographical coordinates associated with the unit, and/or the like. In some implementations, the service coverage model may be used to update one or more entries for the unit in a service coverage data structure that is associated with the service coverage mapping. For example, the one or more entries may indicate whether the unit qualifies for the service and/or whether the unit qualifies to receive the service via an internally mounted antenna.

In some implementations, the one or more actions may include causing a modification to a network associated with the service. For example, when the service qualification metric indicates that the unit is not capable of receiving the service, the service qualification system 104 may cause a modification to the network configured to provide the service (e.g., to cause network coverage to reach a location of the unit). The service qualification system 104 may send a network modification request to a network provider of the network to cause the modification to the network. In this way, the service qualification system 104 may improve network coverage to the unit.

In some implementations, the one or more actions may include providing a notification to a service representative that indicates whether the unit is qualified for the service. For example, the service qualification system 104 may provide, to a user device of the service representative, a notification indicating that the unit is qualified for the service, to allow the service representative to communicate with the user of user device 102 to sign up for the service. As another example, the service qualification system 104 may provide, to the user device of the service representative, a notification indicating that the unit is not qualified for the service, to allow the service representative to communicate with the user of user device 102 to sign up for a different service (e.g., establishment of a local area network via a wired network).

In this way, the service qualification system 104 and/or the user device 102 may be utilized to determine and/or indicate whether a unit qualifies to receive a service based on a type of window of the unit that is determined using an image-based analysis and/or an application of the user device 102. In this way, a service provider of the service may avoid wasting resources that would otherwise be consumed by sending a representative to the unit if the unit does not qualify for the service and/or sending the representative to the unit to use a separate tool from the user device 102 that is specifically configured to determine a type of the window (which requires additional hardware resources).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
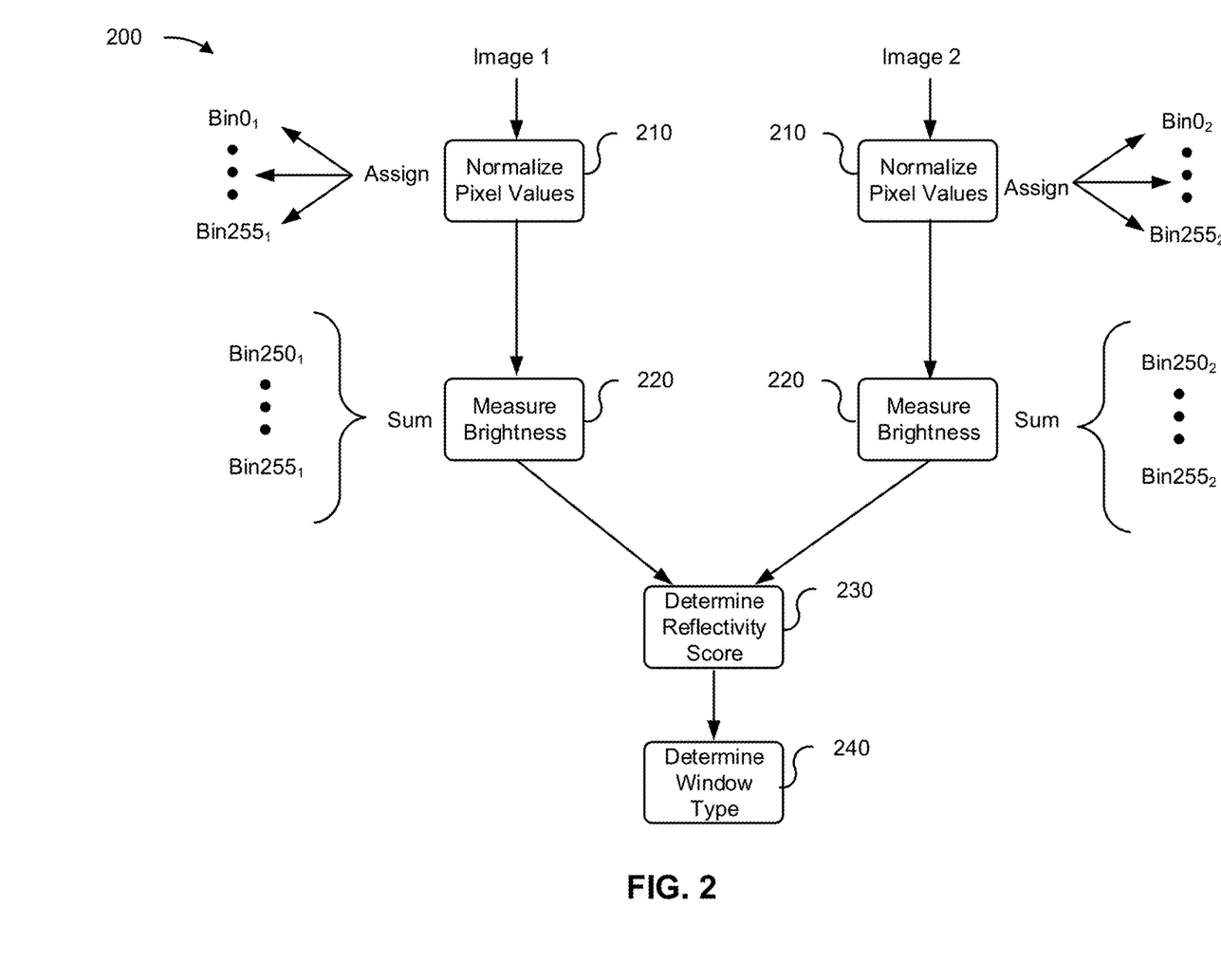
FIG. 2 is a diagram of an example process associated with an image-based window analysis described herein.

FIG. 2 is a diagram of an example process 200 associated with an image-based analysis described herein. The example process 200 may be performed by the user device 102 and/or the service qualification system 104. The process 200 may involve an analysis of a first image (Image 1) that depicts a window and a second image (Image 2) that depicts the window, as described elsewhere herein.

As shown in FIG. 2, and by reference number 210, process 200 may involve normalizing pixel values of the first image and the second image. For example, as shown, based on pixel values of the first image, individual pixels of the first image may be assigned to a first set of bins, and based on pixel values of the second image, individual pixels of the second image may be assigned to a second set of bins. In process 200, the individual pixels of the first image may be assigned to one of a first set of 256 bins ($Bin0_1$ to $Bin255_1$) and the individual pixels of the second image may be assigned to one of a second set of 256 bins ($Bin0_2$ to $Bin255_2$).

As further shown in FIG. 2, and by reference number 220, process 200 may involve measuring the brightness of the first image (a first measure of brightness) and the brightness of the second image (a second measure of brightness). In process 200, a first subset of the first set of bins ($Bin250_1$ to $Bin255_1$) may include a quantity of the brightest pixels (or pixels that satisfy a minimum brightness threshold) of the first image and a second subset of the second set of bins ($Bin250_2$ to $Bin255_2$) may include a quantity of the brightest pixels of the second image. As shown, a first measure of brightness may be determined by summing the quantities of pixels in the first subset of bins, and a second measure of brightness may be determined by summing the quantities of pixels in the second subset of bins.

As further shown in FIG. 2, and by reference number 230, process 200 may involve determining a reflectivity score of the window. For example, the reflectivity score may be determined based on a ratio and/or a difference between the quantity of pixels in the first subset of bins and the quantity of pixels in the second subset of bins. The reflectivity score may be indicative of a degree of a reflection of a flash (e.g., the reflection of the flash in the window) that is depicted in the second image.

In some implementations, certain steps of the process 200 (e.g., steps indicated by reference numbers 210, 220, 230) may be iteratively performed for individual hues of colors of a particular color space. For example, a first iteration may be performed for hues of red for a RGB color space, a second iteration may be performed for hues of green for a RGB color space, and a third iteration of may be performed for hues of blue for a RGB color space. Accordingly, after the first iteration, the second iteration, and the third iteration, the process 200, at reference number 230, may involve determining the reflectivity score according to individual measures of brightness that are based on individual sets of bins for RGB values. For example, the individual measures of brightness may be summed, averaged (e.g., as a weighted average), or combined in any other manner to obtain a measure of brightness as described herein. Other types of color spaces may also be considered, such as a lightness value, red/green value, and blue/yellow value (LAB) color space; a cyan, magenta, yellow, and black (CMYK) color space; a hue, saturation, and value (HSV) color space; and/or a hue, saturation, lightness (HSL) color space.

As further shown in FIG. 2, and by reference number 240, process 200 may involve determining a window type of the window. For example, a type of the window may be determined based on the reflectivity score and whether the reflectivity score satisfies one or more thresholds that are associated with individual types of windows. A first range of reflectivity scores may be indicative of a first type of window (e.g., a window with a particular type of low-E glass, such as a low-E glass with a hard coat), a second range of reflectivity scores may be indicative of a second type of window (e.g., a window with another particular type of low-E glass, such as a low-E glass with a soft coat), a third range of reflectivity scores may be indicative of a third type of window (e.g., a window that does not have low-E glass), and so on.

In this way, the user device 102 and/or the service qualification system 104 may determine a type of a window using an image-based analysis of a set of windows that depict the window, as described herein.

As indicated above, FIG. 2 is provided as an example. Other examples may differ from what is described with regard to FIG. 2.

Figure 3:
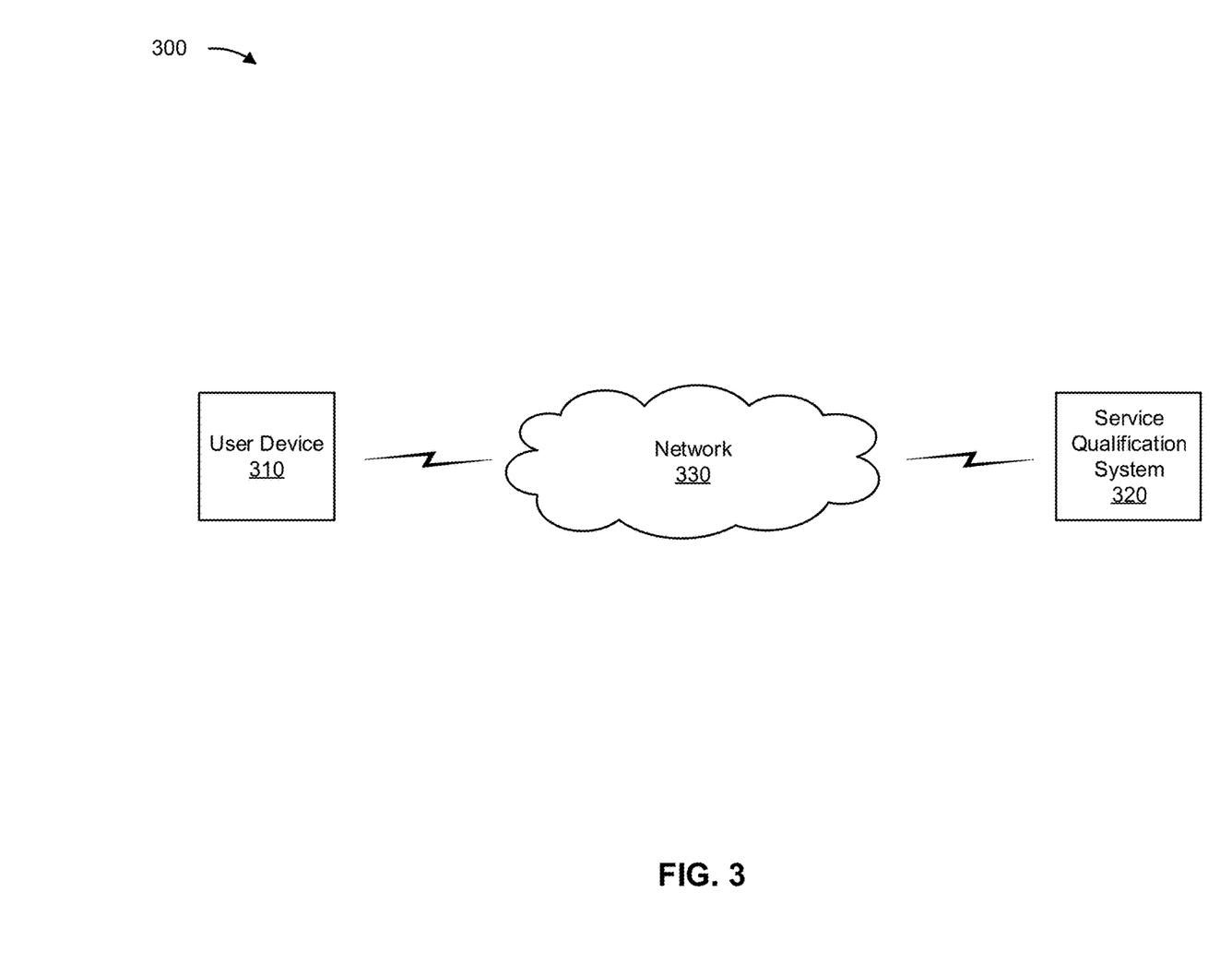
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a service qualification system 320, and a network 330. Devices of environment 300 may interconnect via wired connections, wireless connections, or a combination of wired and wireless connections.

The user device 310 includes one or more devices capable of receiving, generating, storing, processing, and/or providing information associated with qualifying a unit for a service based on images of a window, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The service qualification system 320 includes one or more devices capable of receiving, generating, storing, processing, providing, and/or routing information associated with identifying a service qualification of a unit based on an image-based window analysis, as described elsewhere herein. The service qualification system 320 may include a communication device and/or a computing device. For example, the service qualification system 320 may include a server, such as an application server, a client server, a web server, a database server, a host server, a proxy server, a virtual server (e.g., executing on computing hardware), or a server in a cloud computing system. In some implementations, the service qualification system 320 includes computing hardware used in a cloud computing environment.

The network 330 includes one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
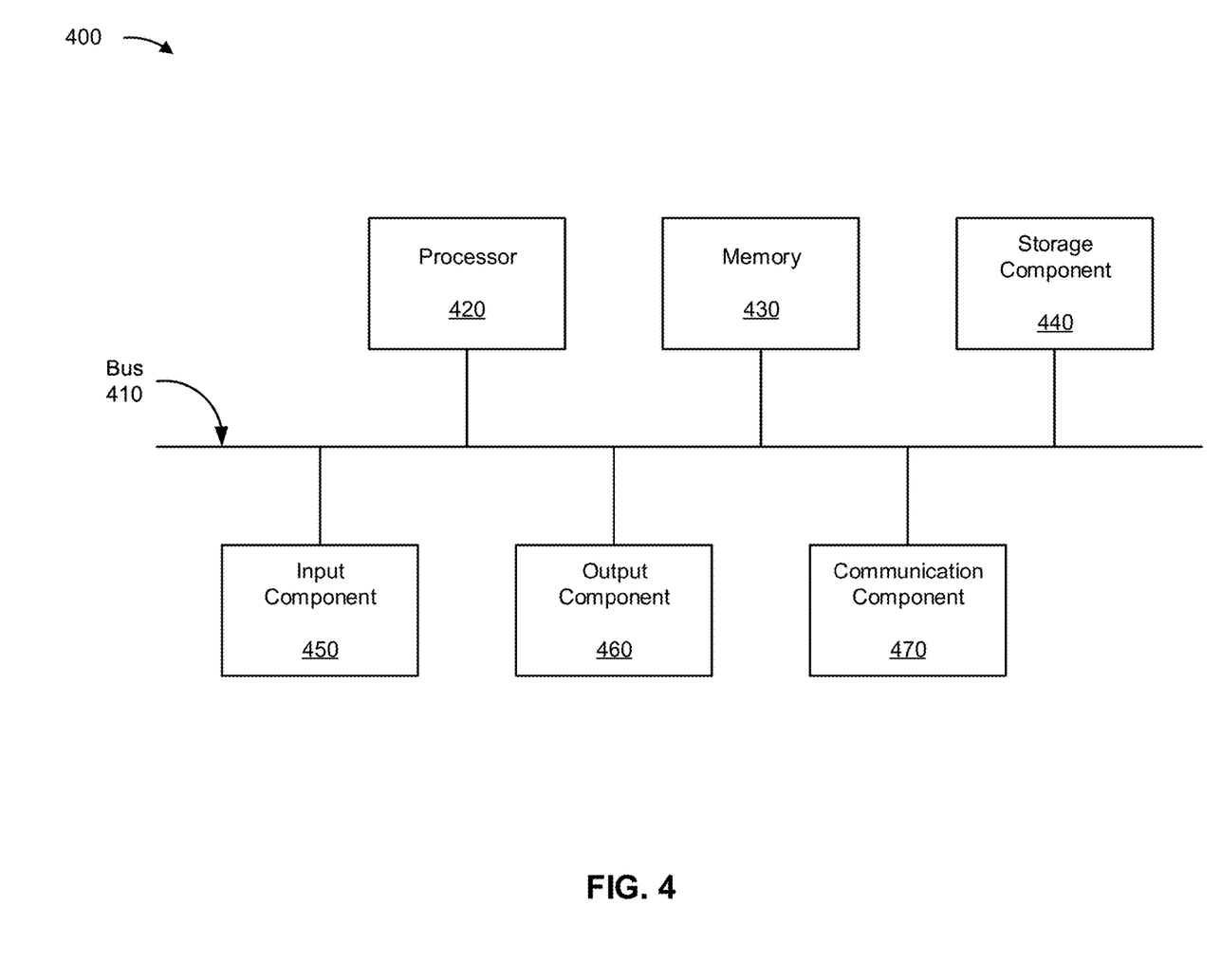
FIG. 4 is a diagram of example components of one or more devices of FIG. 3.

FIG. 4 is a diagram of example components of a device 400, which may correspond to the user device 310 and/or the service qualification system 320. In some implementations, the user device 310 and/or the service qualification system 320 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
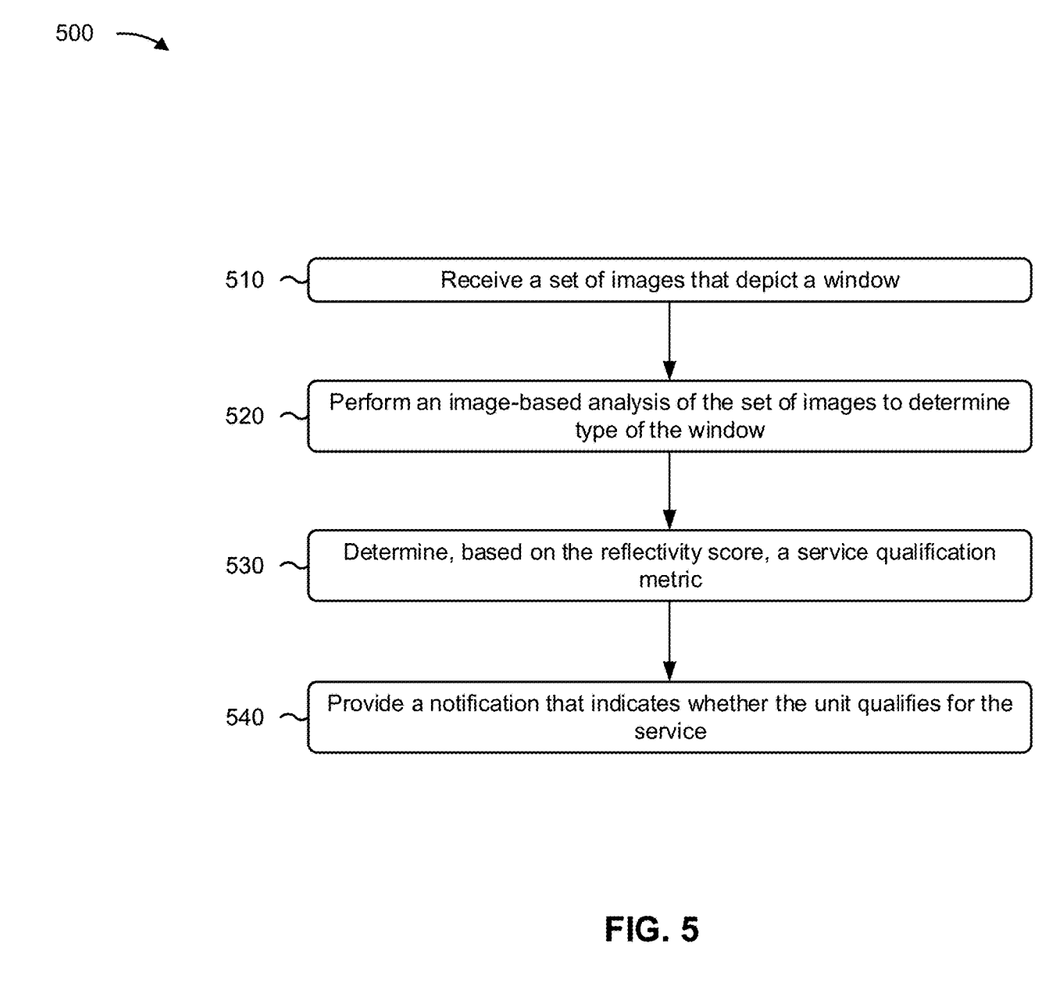
FIG. 5 is a flowchart of an example process relating to identifying a service qualification of a unit based on an image-based window analysis.

FIG. 5 is a flowchart of an example process 500 associated with identifying a service qualification of a unit based on an image-based window analysis. In some implementations, one or more process blocks of FIG. 5 may be performed by a service qualification system (e.g., the service qualification system 320). In some implementations, one or more process blocks of FIG. 5 may be performed by another device or a group of devices separate from or including the service qualification system, such as a user device (e.g., the user device 310). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving a set of images that depict a window (block 510). For example, the service qualification system may receive, from a user device, a set of images that depict the window, as described above.

The user device may be provided an application for installation on the user device, and the application may be configured to control, based on a single user input from the user, the camera to capture the set of images. In some implementations, the set of images includes a first image captured by the camera using a flash mode of the camera and a second image captured by the camera using a non-flash mode of the camera. The application may be configured to control, based on a single user input from the user, the camera to capture a first image, of the set of images, using a flash mode of the camera and a second image, of the set of images, using a non-flash mode of the camera. The application may be configured to control the camera to capture the first image and the second image within a threshold time period. The application may be configured to cause a display device of the user device to indicate an instruction for the user to capture the set of images.

The application may be provided to the user device based on receiving, from the user device, a service request for the service. The application may be configured to be installed on the user device to enable a user of the user device to control a camera of the user device to capture images that depict a window of the unit for an image-based analysis of the window.

As further shown in FIG. 5, process 500 may include performing an image-based analysis of the set of images to determine a type of the window (block 520). For example, the service qualification system may perform the image-based analysis of the set of images to determine a reflectivity score associated with the window, as described above. The reflectivity score may be indicative of a quality associated with a signal of a service being received through the window. The image-based analysis may include a comparison of a first measure of brightness of the first image and a second measure of brightness of the second image, wherein the reflectivity score is based on the first measure of brightness and the second measure of brightness.

The reflectivity score may be determined based on a quantity of pixels in a first image that have pixel values that satisfy a minimum brightness threshold and a quantity of pixels in a second image that have pixel values that satisfy the minimum brightness threshold. For example, the service qualification system, to perform the image-based analysis, may identify a first quantity of pixels in a first image, of the set of images, that satisfy a minimum brightness threshold, identify a second quantity of pixels in a second image, of the set of images, that satisfy the minimum brightness threshold, and determine the reflectivity score based on a ratio of the first quantity of pixels and the second quantity of pixels. The first image may be captured without using a flash and the second image may be captured using the flash. The reflectivity score may indicate that the quality of the signal is sufficient to receive the service within the unit based on the ratio indicating that the second image is less than a percentage brighter threshold than the first image.

As further shown in FIG. 5, process 500 may include determining, based on the reflectivity score, a service qualification metric (block 530). For example, the service qualification system may determine, based on the reflectivity score, a service qualification metric that is indicative of a capability of receiving the service within the unit, as described above. In some implementations, the service qualification system may qualify the unit for the service based on the service qualification metric satisfying a threshold for providing the service. The service qualification metric may be determined based on the reflectivity score, a location of the unit, and a service coverage mapping associated with the service.

As further shown in FIG. 5, process 500 may include providing a that indicates whether the unit qualifies for the service (block 540). For example, the service qualification system may provide a notification that the unit qualifies for the service based on the service qualification metric satisfying a threshold, as described above. The service qualification system may provide the notification to the user device (e.g., via the application).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
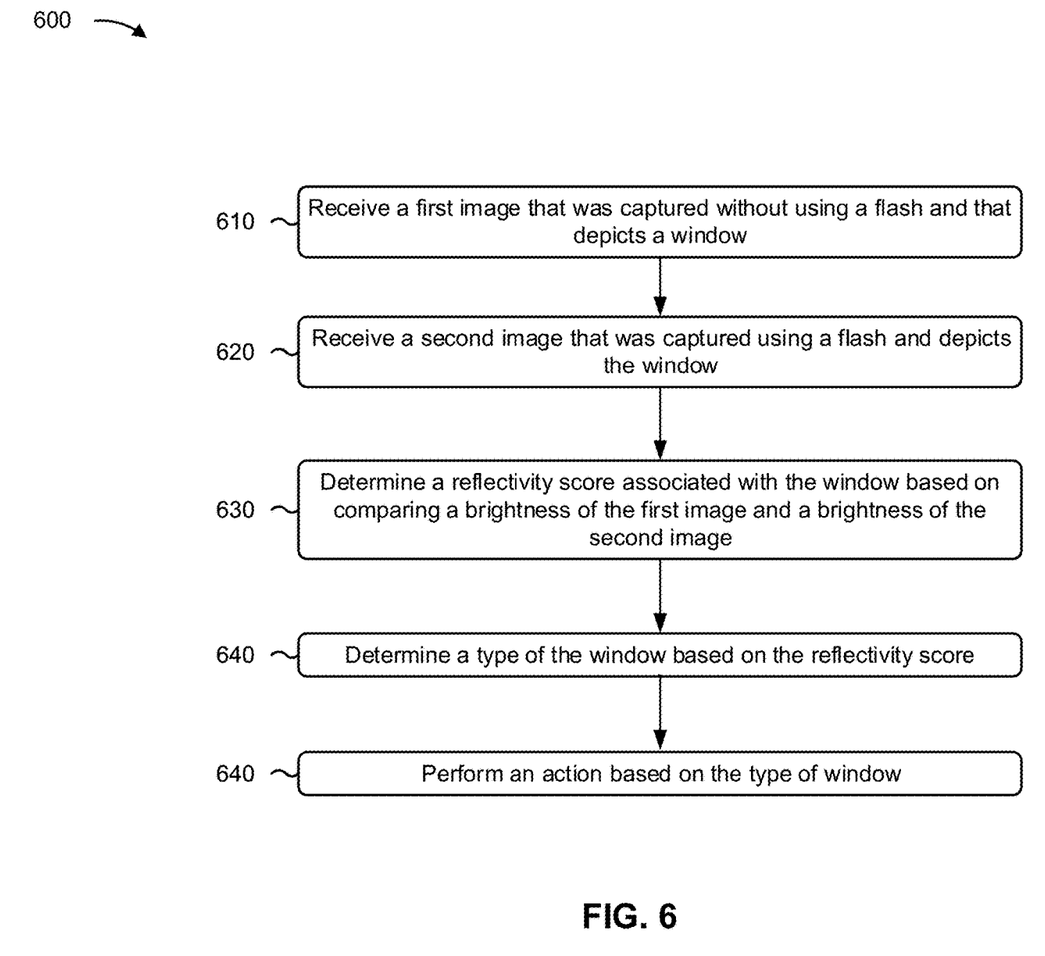
FIG. 6 is a flowchart of an example process relating to determining a type of a window based on an image-based analysis of the window.

FIG. 6 is a flowchart of an example process 600 associated with identifying a service qualification of a unit based on an image-based window analysis. In some implementations, one or more process blocks of FIG. 6 may be performed by a service qualification system (e.g., the service qualification system 320). In some implementations, one or more process blocks of FIG. 6 may be performed by another device or a group of devices separate from or including the service qualification system, such as a user device (e.g., the user device 310). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include receiving a first image that was captured without using a flash and that depicts a window (block 610). For example, the service qualification system may receive first image from a user device (e.g., a user device that captured the first image without using a flash of a camera of the user device), as described above.

As further shown in FIG. 6, process 600 may include receiving a second image that was captured using a flash and that depicts the window (block 620). For example, the service qualification system may receive the second image from the user device (e.g., the user device that captured the first image without using a flash and that captured the second image using the flash), as described above.

As further shown in FIG. 6, process 600 may include determining a reflectivity score associated with the window based on comparing a brightness of the first image and a brightness of the second image (block 630). For example, the service qualification system may determine the reflectivity score based on a first measure of brightness of the first image and a second measure of brightness of the second image, as described above.

As further shown in FIG. 6, process 600 may include determining a type of the window based on the reflectivity score (block 640). For example, the service qualification system may determine whether the window includes low-E glass, whether the window does not include low-E glass, whether the window includes a type of low-E glass, among other examples, as described above.

As further shown in FIG. 6, process 600 may include performing an action based on the type of the window (block 650). For example, the service qualification system may indicate the type of window to a user (e.g., a user of the user device and/or another device associated with the service qualification system). Additionally, or alternatively, the service qualification system may qualify a unit associated with the window for a service (e.g., a wireless communication service), as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
analyzing, by a device, a set of images associated with a window;
determining, by the device and based on analyzing the set of images, a score indicating reflectivity associated with the window;
determining, by the device and based on the score, a value associated with at least one of a type of service or a capability of receiving the service; and
performing, by the device and based on the value, at least one action that includes:
providing a notification indicating whether an entity associated with the window is qualified to receive the service,
updating a service coverage model, or causing a modification to a network associated with the service.

2. The method of claim 1, wherein analyzing the set of images comprises:
determining the value based on a brightness comparison of a first image of the set of images and a second image of the set of images.

3. The method of claim 1, further comprising:
providing an application associated with qualifying the entity to receive the service.

4. The method of claim 1, wherein the set of images is obtained via an application associated with the service.

5. The method of claim 1, wherein the set of images includes a first image that is associated with a flash and a second image that is not associated with using a flash.

6. The method of claim 1, further comprising:
identifying, prior to determining the score, a portion of an image, of the set of images, that is associated with the window.

7. The method of claim 1, wherein determining the value comprises:
determining whether the score satisfies a threshold score associated with a type of the window.

8. A device, comprising:
one or more processors configured to:
analyze a set of images associated with a window;
determine, based on analyzing the set of images, a score indicating reflectivity associated with the window;
determine, based on the score, a value associated with at least one of a type of service or a capability of receiving the service; and
perform, based on the value, at least one action that includes:
providing a notification indicating whether an entity associated with the window is qualified to receive the service,
updating a service coverage model, or
causing a modification to a network associated with the service.

9. The device of claim 8, wherein the one or more processors, to analyze the set of images, are configured to:
determine the value based on a brightness comparison of a first image of the set of images and a second image of the set of images.

10. The device of claim 8, wherein the one or more processors are further configured to:
provide an application associated with qualifying the entity to receive the service.

11. The device of claim 8, wherein the set of images is obtained via an application associated with qualifying the entity to receive the service.

12. The device of claim 8, wherein the set of images includes a first image that is taken with a flash and a second image that is taken without a flash.

13. The device of claim 8, wherein the one or more processors are further configured to:
identify, prior to determining the score, a portion of an image, of the set of images, that is associated with the window.

14. The device of claim 8, wherein the one or more processors, to determine the value, are configured to:
determine whether the score satisfies a threshold score associated with a type of the window.

15. A non-transitory computer-readable medium storing a set of instructions, the set of instructions comprising:
one or more instructions that, when executed by one or more processors of a device, cause the device to:
analyze a set of images associated with a window;
determine, based on analyzing the set of images, a score indicating reflectivity associated with the window;
determine, based on the score, a value associated with at least one of a type of service or a capability of receiving the service; and
perform, based on the value, at least one action that includes:
providing a notification indicating whether an entity associated with the window is qualified to receive the service,
updating a service coverage model, or
causing a modification to a network associated with the service.

16. The non-transitory computer-readable medium of claim 15, wherein the one or more instructions further cause the device to determine the value based on a brightness comparison of a first image of the set of images and a second image of the set of images.

17. The non-transitory computer-readable medium of claim 15, wherein the one or more instructions further cause the device to:
provide an application associated with qualifying the entity to receive the service.

18. The non-transitory computer-readable medium of claim 15, wherein the set of images is obtained via an application associated with qualifying the entity to receive the service.

19. The non-transitory computer-readable medium of claim 15, wherein the set of images includes a first image that is taken with a flash and a second image that is taken without a flash.

20. The non-transitory computer-readable medium of claim 15, wherein the one or more instructions further cause the device to:
identify, prior to determining the score, a portion of an image, of the set of images, that is associated with the window.

* * * * *